UNITED STATES PATENT OFFICE.

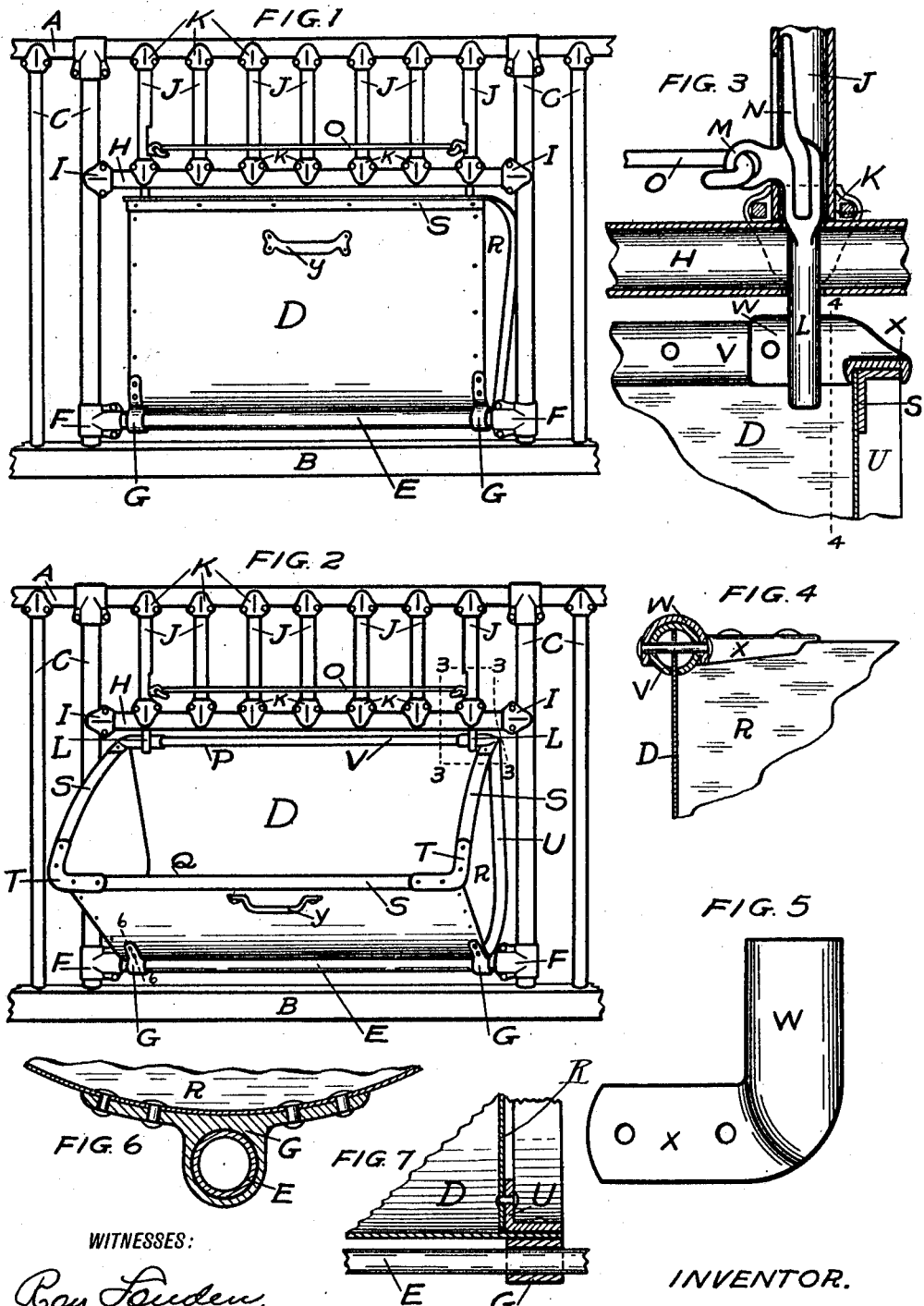

WILLIAM LOUDEN, OF FAIRFIELD, IOWA.

MANGER FOR ANIMAL-PENS.

1,169,412.  Specification of Letters Patent.  Patented Jan. 25, 1916.

Application filed August 3, 1914. Serial No. 854,709.

*To all whom it may concern:*

Be it known that I, WILLIAM LOUDEN, residing at Fairfield, in the county of Jefferson and State of Iowa, have invented a new and useful Improvement in Mangers for Animal-Pens, of which the following is a specification.

My invention relates to mangers for animal pens which are adapted to be moved from the feeding position to a position for cleaning and refilling with feed, and it consists of certain improvements in its construction hereinafter set forth whereby the manger will be of the most simple construction and be easily manipulated and thoroughly effective and reliable in its operation.

In the accompanying drawings forming a part of this specification, Figure 1 is a side view of a panel of an animal pen in which a manger is mounted embodying the features of my invention. Fig. 2 is the same showing the manger in a different position. Fig. 3 is a vertical section on lines 3—3—3—3 of Fig. 2. Fig. 4 is a transverse vertical section on line 4—4 of Fig. 3. Fig. 5 is a detail view. Fig. 6 is a transverse section on line 6 of Fig. 2, the line extending back around a portion of the bottom of the manger so as to show the attachment of one of the pivot castings to the bottom of the manger. Fig. 7 is a sectional detail view.

Referring to the drawings, A represents the top-rail and B the curb or ground support of a portion of a panel of an animal pen having a series of upright rails or pipes C and in which there is an opening for the insertion of a manger D. Immediately below the manger is a horizontally disposed member E preferably a piece of pipe or tubing having its ends abutting against and clamped to the adjacent uprights by clamps F.

A pair of pivot castings G are mounted on the member E and are secured to the under side of the manger D by rivets or bolts as shown in Fig. 6. Being pivoted to the member 1 at its bottom the manger will be free to oscillate or tilt in or out as shown in Figs. 1 and 2, Fig. 1 showing the manger in position so the animal can eat out of it from the inside of the pen and Fig. 2 showing it tilted out on the pivots in position for refilling with feed from the outside of the pen.

Immediately above the manger another horizontally disposed member H similar to the member E, is located by connecting its ends to the adjacent uprights by clamps I. The space between this member and the top rail A is filled with a series of short spaced apart uprights J preferably made of pipes or tubing which are held in place at their upper and lower ends by clamps K.

To prevent the manger from tilting too far and to hold it in its proper positions, vertically disposed holes are drilled through the member H immediately below one or more of the uprights J, preferably the ones above the ends of the manger, corresponding with the hollow in said uprights. The lower ends of these uprights are slotted on their adjacent sides and gravity stop pins L are inserted, as most plainly shown in Fig. 3.

The pins L are provided with laterally disposed lugs M having eyes on their outer ends and made thin enough to pass freely through the slots in the upright J and slide up and down therein. They are also provided with upwardly extending fingers N made broad enough to prevent them from slipping out of the slots over which they slide and the inner sides of which they are adapted to cover. When two of these stop pins are used, which is always preferable, the eyes in the lugs M are connected together by a rod O having hooks on its ends inserted in the eyes as shown.

In use the pins L are dropped down so their lower ends will stand between the upper edges of the manger which are designated by P and Q. When the manger is tilted into feeding position, shown in Fig. 1, the inner side of the edge Q will rest against the lower ends of the pins L and when tilted into refilling or cleaning position, shown in Fig. 2, they will rest against the inner side of the edge P. The weight of the manger over-balancing in opposite directions on the pivots G will normally hold it in either position.

If necessary to tilt the manger farther in either direction for flushing with water or for other purpose, the pins L are raised by lifting on the connecting rod O until the points of the pins are raised above the edges of the manger when it may be tilted as far as it will go in either direction. The pins being either held or again raised to clear the edges, and the manger being raised and the pins dropped between the edges P and Q, the manger will again be held in one or the other of its normal positions, either for feeding or refilling as shown in Figs. 1 and 2.

The main part of the manger consists of a sheet of metal bent substantially as shown, with ends R connected thereto, thereby producing a receptacle of the necessary width and depth to answer the purpose. The outside and end edges are preferably bound with angle irons S connected together by corner irons T. The ends R are preferably connected to the edges of the main sheet by angle irons U attached thereto by rivets or otherwise as more particularly shown in Fig. 7. The pivot castings G are connected to the manger by rivets or bolts passed through the outer flanges of the angles U thus avoiding the necessity for openings through the sheets in the body of the manger and by soldering the seams at the ends the manger may be made water tight.

The inner edge of the manger over which the animal feeds is preferably bound with a slotted tube V, most plainly shown in Figs. 3 and 4, so as to make it as smooth as possible. The corner irons used on this side of the manger are constructed so one end W will fit over the slotted tube V and the other end X over the angle iron S. This makes a neat strong corner connection adapted to fit a pipe or tube at one end and an angle iron at the other end.

As shown in the drawings, the edge of the manger immediately above the handle Y is bound with an angle iron, but if preferred, this edge may be bound with a slotted tube like that used on the inner edge of the manger. When this is done corner irons with one end adapted to fit the tube and the other to fit the angle irons, as already described, will be required. Angle irons are preferable for the curved ends of the manger.

The entire arrangement is extremely simple and effective, and is easily operated, a handle Y being attached to the manger for use in tilting it from one position to another.

What I claim is:—

1. In mangers for animal pens comprising a series of upright posts, two of the posts being spaced apart to provide an opening for the manger, a horizontally disposed member having its ends abutting against and clamped to the posts at the sides of the opening, a manger having castings secured to its under side and pivotally mounted on the horizontal member, whereby the manger may be tilted inwardly and outwardly in the opening, and means to limit the tilting movement of the manger.

2. In mangers for animal pens comprising a series of upright posts, two of the posts being spaced apart to provide an opening for the manger, a horizontally disposed member having its ends abutting against and clamped to the posts at the sides of the opening, a manger having castings secured to its under side and pivotally mounted on the horizontal member, whereby the manger may be tilted inwardly and outwardly in the opening, and a latch secured to the frame of the pen above the manger and adapted to catch on its upper edges and limit the movement of the manger.

3. In a device of the character described, a panel having vertically disposed posts set a distance apart, upper and lower horizontally disposed members connected to said posts so as to leave an opening in the panel, the upper members having one or more vertically disposed holes therein, vertically disposed tubular members connected thereto immediately over said holes, a manger pivoted to the lower member and adapted to tilt inwardly and outwardly in the opening, and gravity pins loosely inserted in said holes and extending upwardly into said tubular members and adapted to drop between the inner edges of the manger and limit the movement of the manger.

4. In a device of the character described, the combination with a tilting manger of a horizontally disposed member located above the manger and having two vertically disposed holes therein, vertically disposed tubular members connected thereto immediately above the holes and having slots in the adjacent sides, gravity pins inserted in said holes having lateral lugs with eyes extending out through said slots and means connecting the eyes together whereby the pins may be raised to clear the edges of the manger or allowed to drop and come in contact with the edges of the manger.

5. In a device of the character described, the combination with a tilting manger of a horizontally disposed member located above the manger and having two vertically disposed holes therein, vertically disposed tubular members connected thereto immediately above the holes and having slots in the adjacent sides, gravity pins inserted in said holes having lateral lugs with eyes extending out through said slots and a rod connecting the eyes together whereby the pins may be raised to clear the edges of the manger or allowed to drop and come in contact with the edges of the manger.

6. A tilting manger for animal pens comprising a bent metal sheet and two end metal sheets joined together by angle irons secured to the outer edges of the end sheets, and to the ends of the main sheet outside of the end sheets, and pivot castings secured to the ends of the main sheets and to the angle irons outside of the end sheets.

7. A manger for animal pens comprising a bent metal sheet and two end metal sheets, suitably joined together, some of the edges of the sheets being reinforced by angle irons and the edges of adjoining sheets reinforced by a slotted tube, the adjoining ends of the reinforcing irons being braced by corner irons having one end made flat to fit the angle iron and the other made concave to fit the slotted tube.

Fairfield, Iowa, August 1, 1914.

WILLIAM LOUDEN.

Witnesses:
CARRIE L. BEEDLE,
HENRY H. NIEMANN.

Copies of this patent may be obtained for five cents each, by addressing the "Commissioner of Patents, Washington, D. C."

It is hereby certified that in Letters Patent No. 1,169,412, granted January 25, 1916, upon the application of William Louden, of Fairfield, Iowa, for an improvement in "Mangers for Animal-Pens," an error appears in the printed specification requiring correction as follows: Page 1, line 48, for the reference-numeral "1" read *E;* and that the said Letters Patent should be read with this correction therein that the same may conform to the record of the case in the Patent Office.

Signed and sealed this 21st day of March, A. D., 1916.

[SEAL.]

Cl. 119—63

J. T. NEWTON,
*Acting Commissioner of Patents.*